United States Patent
Park

[19]

[11] Patent Number: 6,009,529
[45] Date of Patent: Dec. 28, 1999

[54] METHOD OF REALIZING DPMS FUNCTION OF DISPLAY DEVICE USING USB

[75] Inventor: Geun-Woo Park, Kyungki-do, Rep. of Korea

[73] Assignee: SamSung Electronics Co., Ltd., Kyungki-do, Rep. of Korea

[21] Appl. No.: 09/039,941

[22] Filed: Mar. 17, 1998

[30] Foreign Application Priority Data

Apr. 14, 1997 [KR] Rep. of Korea ...................... 97-13557

[51] Int. Cl.⁶ ...................................................... H04B 7/216

[52] U.S. Cl. ........................... 713/320; 713/323; 713/324

[58] Field of Search ...................................... 713/300–340

[56] References Cited

U.S. PATENT DOCUMENTS

| 5,389,952 | 2/1995 | Kikinis | 345/212 |
| 5,555,032 | 9/1996 | Kung | 348/730 |
| 5,675,813 | 10/1997 | Holmdahl | 713/310 |
| 5,799,196 | 8/1998 | Flannery | 713/320 |

*Primary Examiner*—Ayaz R. Sheikh
*Assistant Examiner*—David A. Wiley
*Attorney, Agent, or Firm*—Robert E. Bushnell, Esq.

[57] ABSTRACT

A method of realizing DPMS function of a display using an USB is proposed. In the DPMS mode transition performed by recognizing input states of horizontal and vertical synchronous signals, the operation state of the USB is confirmed when the DPMS mode is converted from suspend mode to power off mode. Accordingly, the transition to the power off mode is prevented when the USB is in operation, thereby protecting the USB from malfunctioning.

1 Claim, 4 Drawing Sheets

METHOD OF REALIZING DPMS FUNCTION OF DISPLAY DEVICE USING USB

CLAIM OF PRIORITY

This application makes reference to, incorporates the same herein, and claims all benefits accruing under 35 U.S.C. §119 from my application entitled METHOD OF REALIZING DPMS FUNCTION OF DISPLAY DEVICE USING USB filed with the Korean Industrial Property Office on Apr. 14, 1997, and there duly assigned Ser. No. 97-13557 by that Office.

BACKGROUND OF THE INVENTION

1. Field of the Invention

The present invention relates to a computer system using an universal serial bus (USB) and, more particularly, to a method of realizing display power management signaling (DPMS) function of a display device, which confirms the operation state of USB when a display control mode is converted into power off mode in the execution of the DPMS function, thereby preventing errors in the operation of the USB in the mode conversion according to the DPMS operation.

2. Discussion of Related Art

A general computer system includes computer main body (referred to as computer hereinafter) managing information and various peripheral devices processing the information. FIG. 1 shows a configuration of this computer system. Referring to FIG. 1, as input means for inputting information in computer 1, there are keyboard 2 having a plurality of keys and mouse 3 used for forming graphics. A display device 4, output means, displays information transmitted from the computer on its display picture as an image. In addition to, a modem, printer, sound device and scanner are used as computer peripheral devices. Each of these devices must occupy a port obtained from one of slots usable on the motherboard in computer 1. For this, a user is required to open the computer's case and insert interface cards for the slots into the board. Furthermore, there are cases where the user should operate switches, set jumpers, and divide connectors into parallel and serial types. Due to these complicated procedures, users easily give up the setting of new devices. Moreover, since there are limits in the number of slots of the computer, the addition of peripheral devices is not possible when the slots are all occupied.

To meet the demand for more various convenient peripheral devices, a computer system using USB, as shown in FIG. 2, has been developed. FIG. 2 shows USB 10, computer 1, display 4, printer 5, scanner 6 and exterior modem 7. With the use of this USB, the addition of peripheral device becomes very easy, so that there is no need for the user to open the computer case to connect peripheral devices or related cards. Devices like keyboard and display are directly connected to the computer and other peripheral devices are easily connected through extension hubs included in the keyboard and display, or through a separate USB device. These extension hubs provide additional connection sockets and can be connected in tree shape. The peripheral devices may have up to several meters of distance from one another or from the extension hub.

The USB can connect 127 other devices in total to one computer, and transmits 5V of operation voltage, to solve the problem that many peripheral devices currently used consume high AC power. Furthermore, the USB has rapid data transmission rate of 12 Mbit/sec so that it can provide vast processing capability for most peripheral devices having higher band widths only with the cost corresponding to the current connector technique. Accordingly, the USB will become main characteristics in the next computer system. A telephone network, modem, printer, microphone, mouse, scanner and digital camera can be connected through the USB to the computer. The USB has two main effects of simplicity and convenience. The USB detects the addition or removal of device to/from the computer based on information from the computer. This operation can be performed in power-on state, in contrast to the operation of conventional built-in slots. Thus, there is no need to reboot the system. Moreover, the USB supports real plug-and-play operation. The USB automatically determines information about resources such as driver software and bus bandwidth required for each peripheral device, and secures the information to allow the display to use it without interference of the user.

FIG. 3 shows a configuration of the USB in detail. Referring to FIG. 3, USB 10 includes a USB control bus 11 for controlling information transmission between computer 1 and peripheral devices using data and clock provided by display device 4, a DC—DC converter 12 for processing the power supplied from display device 4 to provide operation power to USB control circuit 11 and down stream ports 14, 15 and 16 respectively connected to peripheral devices 5, 6 and 7, and an over-current protection circuit 13 for detecting output current of DC—DC converter 12 to prevent damages due to over-current.

In this configuration, the power (14V) supplied from display device 4 passes through DC—DC converter 12, to be provided to USB control circuit 11 as its operation voltage (5V). Here, display device 4 and USB control circuit 11 are constructed in such a manner that they can transmit data and clock from each other. The power (5V) from DC—DC converter 12 is supplied to USB control circuit 11 and to peripheral devices 5, 6 and 7 through down stream ports 14, 15 and 16. The computer is connected to up stream port of USB 10. In this case, USB environment is set in the computer, and computer 1 automatically supports the USB control environment. When computer peripheral devices 5, 6 and 7 are connected to down streams 14, 15 and 16 of USB 10, computer 1 confirms IDs registered, and automatically installs when there is no error. Accordingly, the user can use the peripheral devices without separate operation.

Display device 4, a typical peripheral device of the computer, displays signals transmitted from computer 1 as images to allow the user to be able to recognize it. FIG. 4 shows a basic configuration of the inner circuit of the display device. Referring to FIG. 4, the inner circuit of the conventional display includes: a video card 210, installed in a computer (not shown), for providing color signals (R,G,B) required for color formation and horizontal/vertical synchronous signals (H_Sync/V_Sync); a microcomputer 220 for receiving the horizontal/vertical synchronous signals from video card 210, and generating a picture control signal for controlling a monitor picture; vertical deflection circuit 230 and horizontal deflection circuit 240 for receiving the horizontal synchronous signal (H_Sync) and vertical synchronous signal (V_Sync) and performing horizontal deflection and vertical deflection to enable electron beam generated by an electron gun of a CRT 280 to be sequentially deflected starting from the top of the left portion of CRT 280 to the bottom of its right portion by a defection yoke, thereby forming an image like one picture; a high voltage circuit 250 for supplying a high voltage to the anode of CRT 280 using a blanking pulse generated from the output port of horizontal deflection circuit 240 according to the principle of switching circuit and high voltage technique; a video pre-amplifier 260 for amplifying a low-level image signal (R,G,B) transmitted from video card 110 with a low voltage amplifier, to maintain the signal at a specific voltage level; and a video main amplifier 270 for amplifying the signal amplified by video pre-amplifier 260 to 40 Vpp to 60 Vpp of signal, to supply energy to each pixel of the display.

In this display device, the images are formed using electron beam projected on the fluorescent screen. Here, a circuit which converts the deflection of the electron beam is called deflection circuit. According to "DPMS PROPOSAL", which was published and distributed in U.S.A. Jan. 26, 1993, the operations of the horizontal/vertical deflection circuits can be controlled using horizontal synchronous signal HS and vertical synchronous signal VS supplied to display device 4 from computer 1. Here, computer 1 selectively applies the horizontal synchronous signal HS and vertical synchronous signal VS to display device 4, to operate display device 4 in one control mode of normal mode, stand-by mode, suspend mode and power off mode.

The normal mode is for normal supplying power to display device 4. In the stand-by and suspend modes, video signals, processed by the video processor of the display, are muted, so as not to be displayed. Here, the stand-by mode and suspend mode cut off the horizontal synchronous signal HS and vertical synchronous signal VS, respectively. The power off mode is for cutting off the power supply to display device 4. This control mode is sequentially converted from the normal operation mode, stand-by mode, suspend mode to power off mode, corresponding to a period during which the computer system is not used.

Accordingly, the display device detects if the horizontal and vertical synchronous signals HS and VS are received from the computer, and executes corresponding power saving mode. However, there are problems in the realization of the DPMS function of the display using the USB. As described above, the USB operates based on the power provided by the display device. If the display operates in the power off mode according to the DPMS function, only 8 W approximately is supplied to the display. Thus, the USB cannot be normally operated because sufficient power is not supplied from the display device normally.

SUMMARY OF THE INVENTION

Accordingly, the present invention is directed to a method of realizing DPMS function of a display device using USB that substantially obviates one or more of the problems due to limitations and disadvantages of the related art.

An object of the present invention is to provide a method of realizing DPMS function of a display using an USB, which, in the execution of power saving mode function of the display device, includes a process of confirming the operation state of the USB function before the transition to power off mode, thereby preventing errors in the operation of the USB.

To accomplish the objective of the present invention, there is provided a method of realizing DPMS function of a display using an USB, which includes a process of confirming the operation state of the USB when a DPMS mode is converted from suspend mode to power off mode, the DPMS mode being converted by recognizing input states of horizontal and vertical synchronous signals.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
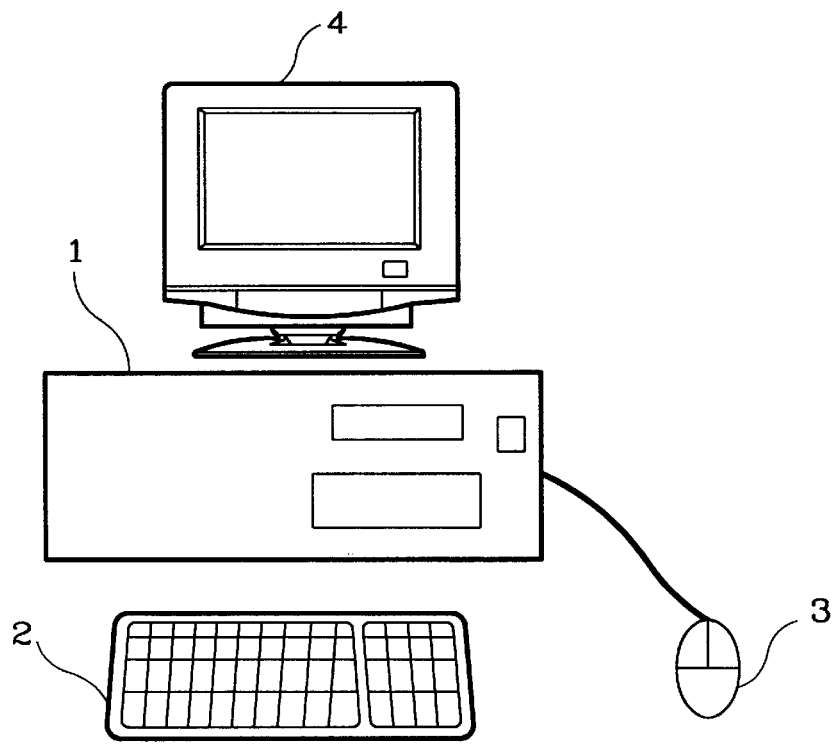
FIG. 1 is a diagram showing a configuration of a conventional computer system.
Figure 2:
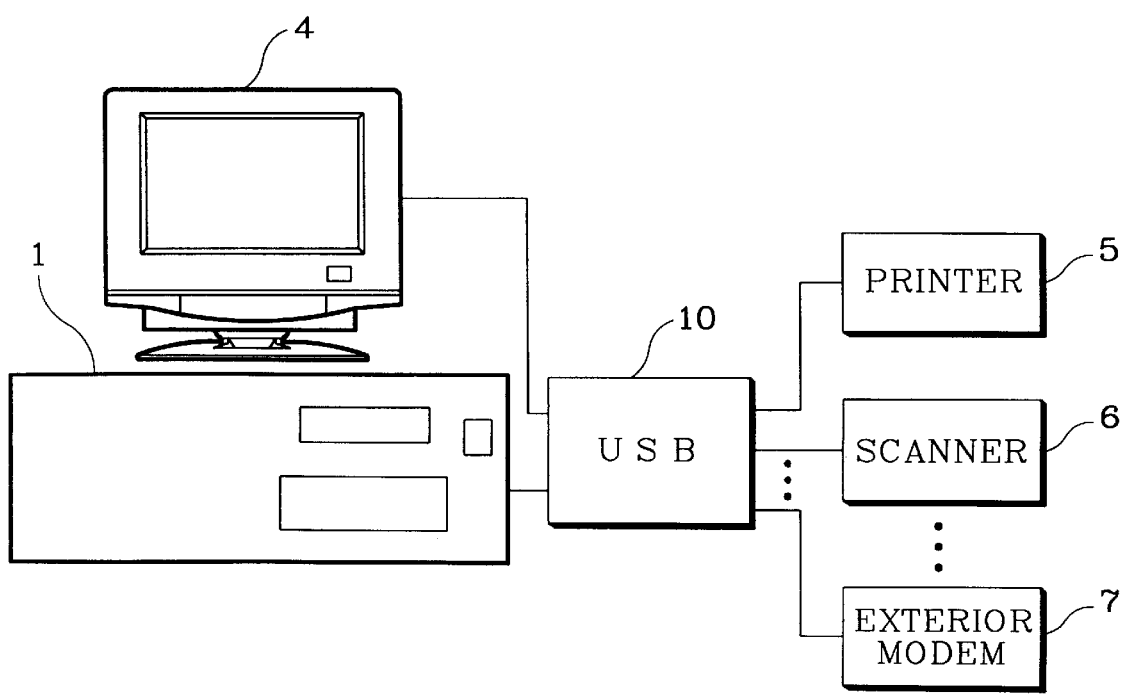
FIG. 2 is a diagram showing a configuration of a computer system to which an USB is applied.
Figure 3:
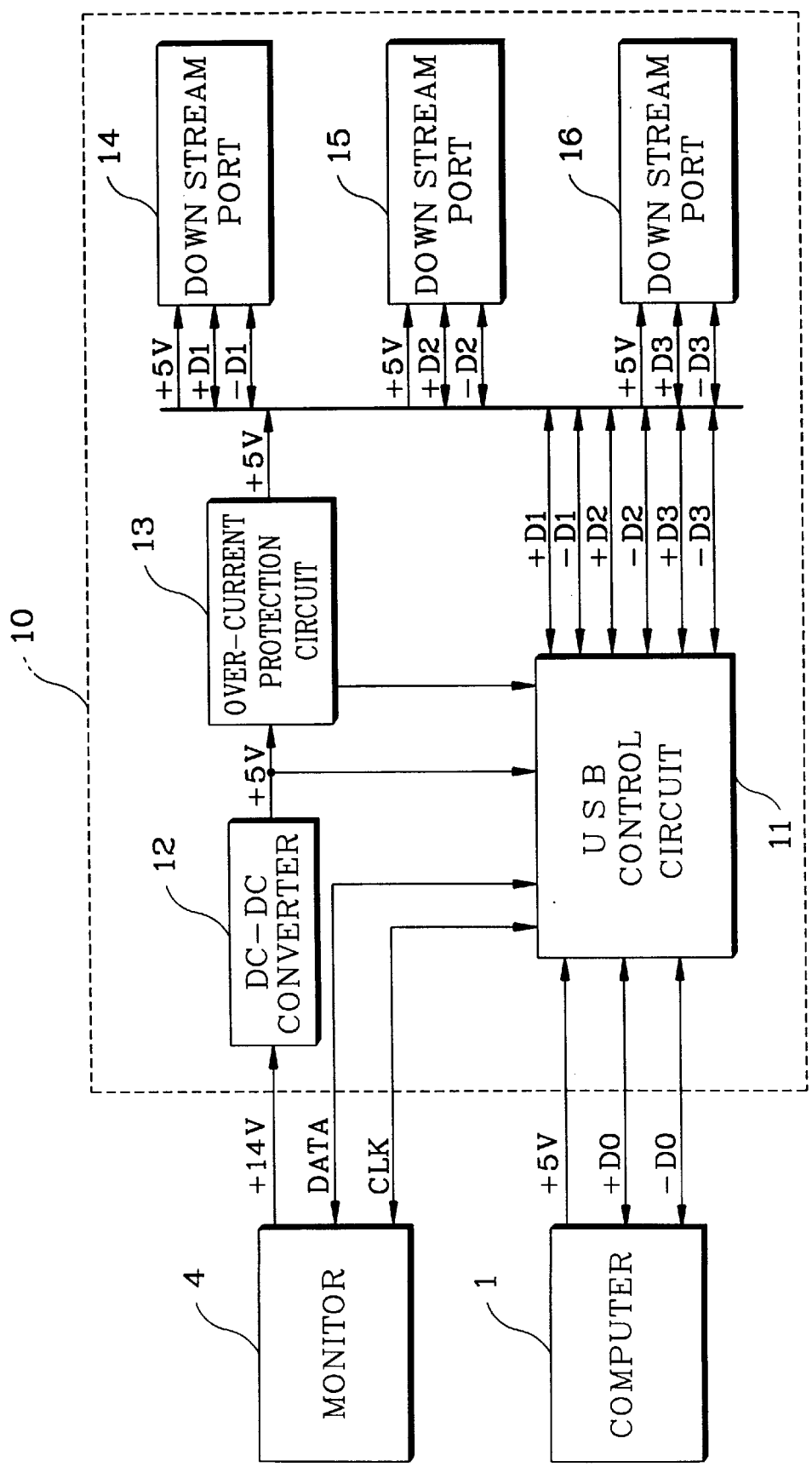
FIG. 3 is a diagram showing a configuration of the USB in detail.
Figure 4:
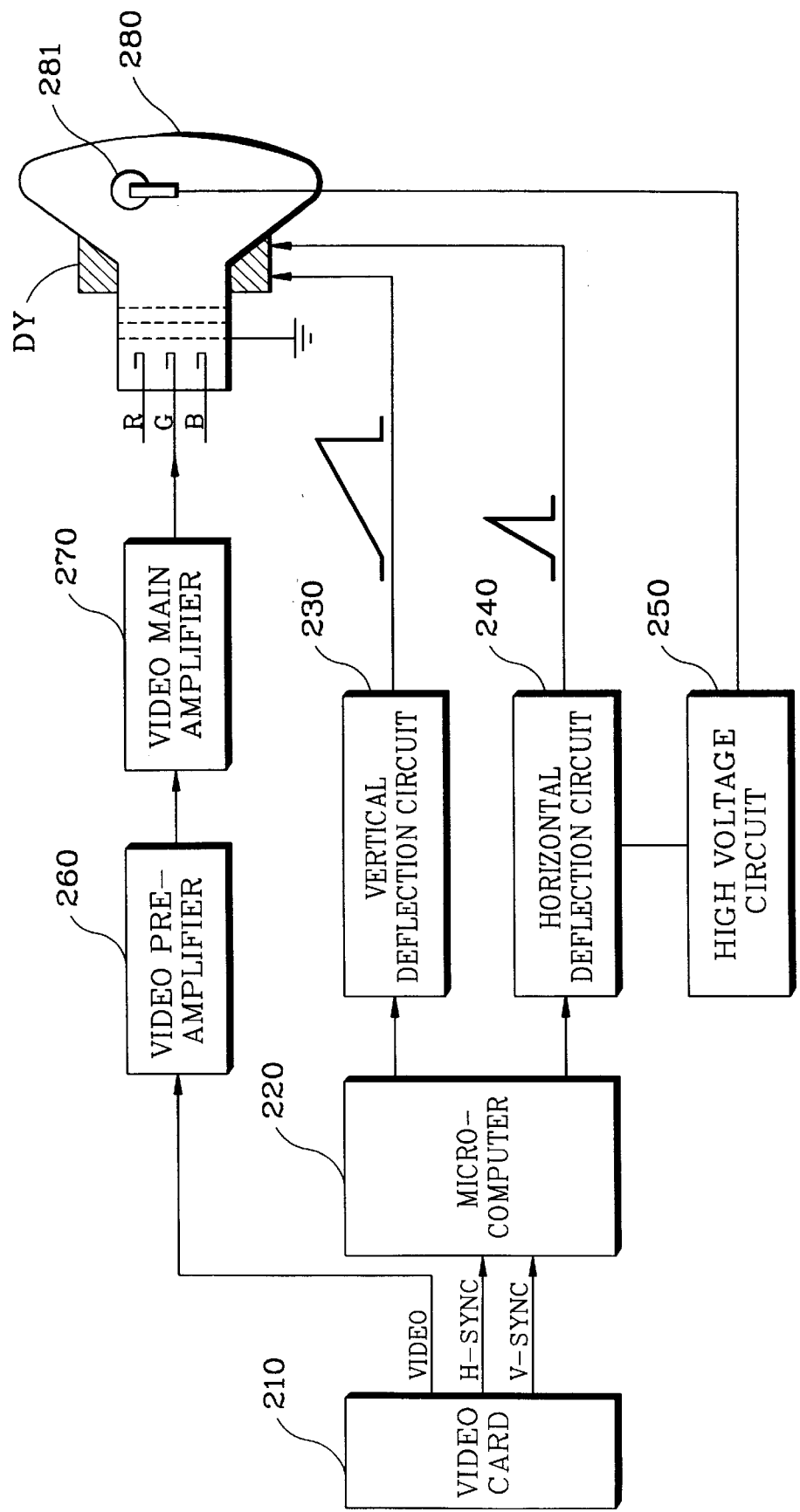
FIG. 4 is a block diagram of a conventional display device.
Figure 5:
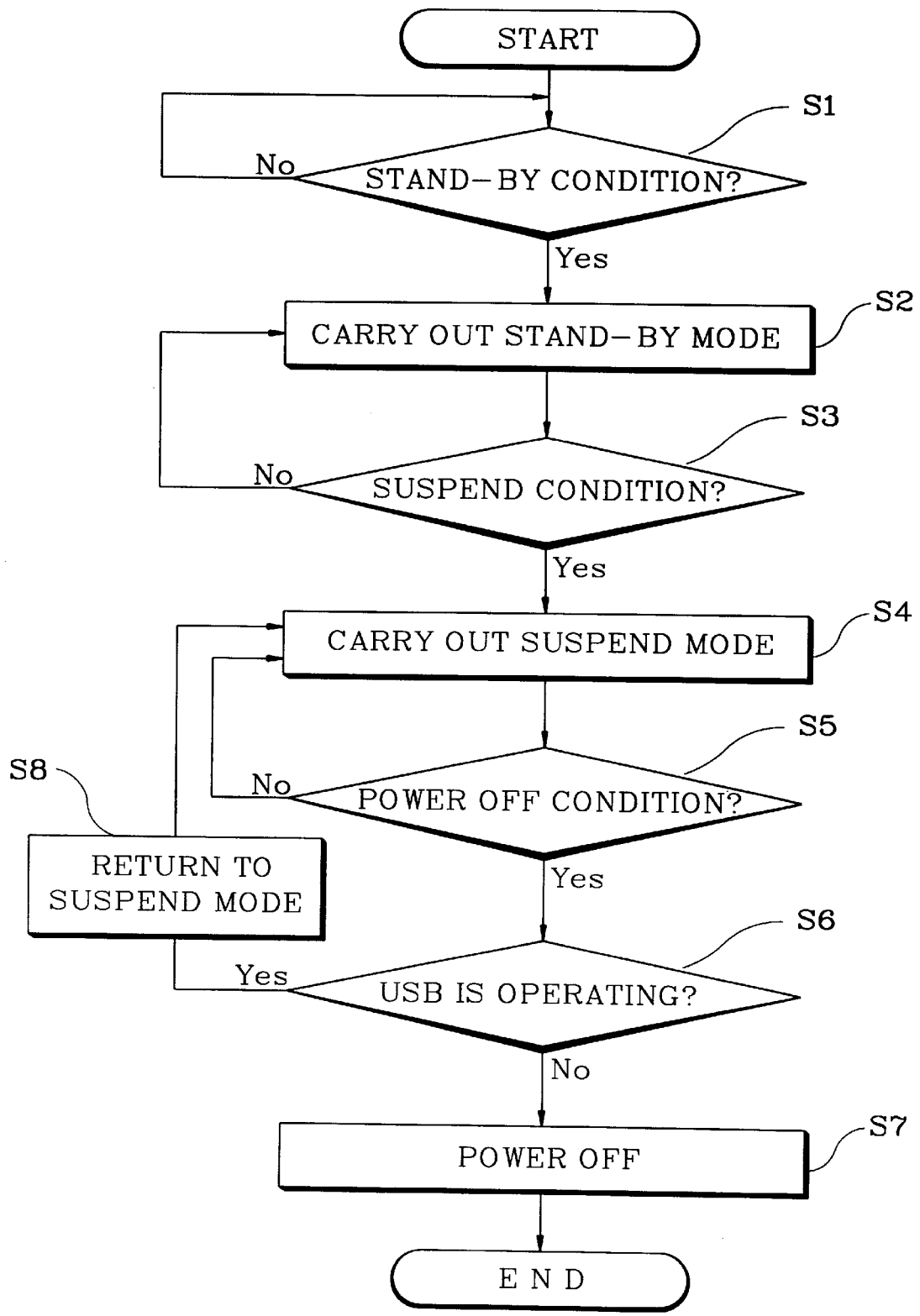
FIG. 5 is a flow diagram showing a method of realizing DPMS function of a display according to the present invention.

FIG. 5 is a flow diagram showing a method of realizing DPMS function of a display device according to the present invention. Referring to FIG. 5, first of all, the display device which operates in the normal mode counts a time during which there is no input from the user, to confirm if the counted time correspond to the stand-by mode condition in step S1. When there is no input from the user for a predetermined time, the display device cuts off the outputting of the horizontal synchronous signal, to convert the DPMS mode into stand-by mode in step S2. Then, the display device in the stand-by mode confirms if the current state corresponds to the condition of transition to suspend mode in step S3, and, when it is, cuts off the outputting of the vertical synchronous signal, to convert the DPMS mode into suspend mode in step S4.

In step S5, the display device in the suspend mode confirms if the current state corresponds to the condition of transition to power off mode, and, when it is, confirms the current operation state of the USB in step S6. When the USB completes its operation or does not operate, the display device converts the mode into the power off mode, to reduce its consumption power to the minimum (approximately 8 W) in step S7. On the other hand, the USB is in operation, the display device returns to the suspend mode to withhold the transition to the power off mode in step S8. By doing so, it is possible to confirm if the USB function is carried out or not when the DPMS mode is converted from the suspend mode to the power off mode.

As described above, in the realization of the DPMS function of a display device using an USB, the present invention confirms if the USB function is used or not when the DPMS mode is converted from the suspend mode to the power off mode, thereby removing problems generated when the display device is turned off while the USB is in operation.

It will be apparent to those skilled in the art that various modifications and variations can be made in the method of realizing DPMS function of a display device using an USB of the present invention without departing from the spirit or scope of the invention. Thus, it is intended that the present invention cover the modifications and variations of this invention provided they come within the scope of the appended claims and their equivalents.

What is claimed is:

1. A method of realizing DPMS function of a display device using an USB, comprising the steps of:

confirming if the current state corresponds to stand-by mode condition or not;

converting a display control mode into the stand-by mode when the current state corresponds to the stand-by mode condition;

confirming, in the stand-by mode state, if the current state corresponds to the condition of transition to suspend mode;

converting the display control mode into the suspend mode when the current state corresponds to the condition of transition to the suspend mode;

confirming, in the suspend mode state, if the current state corresponds to the condition of transition to power off mode;

confirming the current operation state of the USB when the current state corresponds to the condition of transition to the power off mode; and converting the display control mode into power saving mode according to the current state of the USB.

* * * * *